US012799256B2

(12) United States Patent
Miao et al.

(10) Patent No.: US 12,799,256 B2
(45) Date of Patent: Nov. 17, 2026

(54) POLYMER HAVING DISPERSING FUNCTION, POLYCARBOXYLIC ACID CEMENT DISPERSANT, PREPARATION METHOD THEREFOR AND USE THEREOF

(71) Applicants: CHINA PETROLEUM & CHEMICAL CORPORATION, Beijing (CN); Sinopec Petroleum Engineering Technology Research Institute Co., Ltd, Beijing (CN)

(72) Inventors: Xia Miao, Beijing (CN); Shiming Zhou, Beijing (CN); Haoguang Wei, Beijing (CN); Guangguo Yang, Beijing (CN); Lishuang Wang, Beijing (CN); Qichun Wang, Beijing (CN); Mu Wang, Beijing (CN); Xiaojing Wang, Beijing (CN); Min Zeng, Beijing (CN); Jian Liu, Beijing (CN); Xiaojiang Li, Beijing (CN); Xuepeng Wu, Beijing (CN); Haoya Liu, Beijing (CN)

(73) Assignees: CHINA PETROLEUM & CHEMICAL CORPORATION, Beijing (CN); Sinopec Petroleum Engineering Technology Research Institute Co., Ltd, Beijing (CN)

( * ) Notice: Subject to any disclaimer, the term of this patent is extended or adjusted under 35 U.S.C. 154(b) by 803 days.

(21) Appl. No.: 18/248,371

(22) PCT Filed: Aug. 13, 2021

(86) PCT No.: PCT/CN2021/112586
§ 371 (c)(1),
(2) Date: Apr. 7, 2023

(87) PCT Pub. No.: WO2022/078046
PCT Pub. Date: Apr. 21, 2022

(65) Prior Publication Data

US 2023/0391941 A1 Dec. 7, 2023

(30) Foreign Application Priority Data

Oct. 13, 2020 (CN) ......................... 202011092106.0

(51) Int. Cl.
*C08F 290/14* (2006.01)
*C04B 24/42* (2006.01)
*C09K 8/467* (2006.01)
*C04B 103/40* (2006.01)

(52) U.S. Cl.
CPC .......... *C08F 290/142* (2013.01); *C04B 24/42* (2013.01); *C09K 8/467* (2013.01); *C04B 2103/408* (2013.01)

(58) Field of Classification Search
CPC ...... C08F 290/142; C04B 24/42; C09K 8/467
See application file for complete search history.

(56) References Cited

U.S. PATENT DOCUMENTS 5,798,425 A * 8/1998 Albrecht ............... C08F 222/06 526/333
7,232,873 B2 6/2007 Tomita et al.
2002/0055559 A1 5/2002 Kistenmacher et al.

FOREIGN PATENT DOCUMENTS

CN 103030334 A 4/2013
CN 105754045 A 7/2016
(Continued)

OTHER PUBLICATIONS

Kong, Xiangming et al.; "Influence of Silanized Polycarboxylate Polymers on Fluidity and Strength Development of Cementitious Material"; Journal of the Chinese Ceramic Society; vol. 42, No. 5; May 2014; pp. 635-641.

*Primary Examiner* — John E Uselding
(74) *Attorney, Agent, or Firm* — NKL Law; Allen Xue

(57) ABSTRACT

A polymer having a dispersing function, a preparation method therefor and use thereof as a cement dispersant are provided. The polymer has a structural unit (a), a structural
(Continued)

unit (b) and a structural unit (c). The structural unit (a) is provided by an unsaturated polyether, the structural unit (b) is provided by an unsaturated acid and/or a salt thereof and/or an anhydride thereof, and the structural unit (c) is provided by a silane and/or siloxane having a polymerizable group and no less than five carbon atoms. The molar ratio of the structural unit (a), the structural unit (b) and the structural unit (c) is 1:(1-20):(0.01-0.5); and the polymer has a weight average molecular weight of 20,000-90,000 g/mol.

18 Claims, 6 Drawing Sheets

(56) References Cited

FOREIGN PATENT DOCUMENTS

| | | | |
|---|---|---|---|
| CN | 107245131 | A | 10/2017 |
| CN | 104558434 | B | 11/2017 |
| CN | 108250370 | A | 7/2018 |
| CN | 109942757 | A | 6/2019 |
| CN | 111171245 | A | 5/2020 |
| EP | 0736553 | B1 | 6/2001 |
| EP | 4190829 | A1 | 6/2023 |
| JP | 08283350 | A | 10/1996 |
| JP | H08283350 | A | 10/1996 |
| JP | H09194538 | A | 7/1997 |
| JP | 2001507054 | A | 5/2001 |
| JP | 2005272553 | A | 10/2005 |

* cited by examiner

POLYMER HAVING DISPERSING FUNCTION, POLYCARBOXYLIC ACID CEMENT DISPERSANT, PREPARATION METHOD THEREFOR AND USE THEREOF

CROSS REFERENCE TO RELATED APPLICATIONS

This application is a national entry of International Application No. PCT/CN2021/112586 filed on Aug. 13, 2021, which claims the benefit of priority to the Chinese Patent Application No. 202011092106.0, filed on Oct. 13, 2020, entitled "POLYMER HAVING DISPERSING FUNCTION, POLYCARBOXYLIC ACID CEMENT DISPERSANT, PREPARATION METHOD THEREFOR AND USE THEREOF", the content of which is entirely incorporated herein by reference.

TECHNICAL FIELD

The present disclosure relates to the technical field of well cementation, in particular to a polymer having a dispersing function and a polycarboxylic acid cement dispersant and a preparation method thereof and an use in the well cementation with cement.

BACKGROUND ART

The well cementation operations require the pumping of a cement slurry into the annular space between the casing pipe and the wellbore, the cement slurry to be pumped shall have desirable flowing property, while in the practical operations, especially in the well cementation operations which involve with a high temperature, a high pressure, and complicated well conditions, it is necessary to append a variety of additives or admixtures such as a retarder, a filtrate reducer, a weighting agent, a latex material into the cement slurry to meet the requirements of well cementing, the additives or admixtures often result in the poor fluidity of slurry, such that the slurry can hardly be pumped. Therefore, it is generally necessary to add a dispersant into the cement slurry, such that the cement slurry has a reduced viscosity and an increased flowing property under the condition of fixed water-cement ratio, thereby performing an injection of cement slurry with low velocity and turbulent flow.

The dispersants for oil well cement slurry in domestic and foreign countries currently in use are primarily the sulfonated aldehyde ketone condensation polymer dispersants, which have been widely used in oil fields since the 1970s, but the disadvantages of such dispersants have been revealed along with the rapid upgrading of other additives and adjuvants of the oil well cement and increasingly stringent environmental protection standards: 1. the dispersants are not compatible with the novel additives and adjuvants; 2. the dispersants have low dispersion efficiency for the cement slurries added with the complex particles (e.g., latex, rubber particles); and 3. their raw material contains formaldehyde, which is currently subjected to a restrained production condition.

At present, the polycarboxylic acid water reducers are commonly used in the construction industry, and the patents of polycarboxylic acid water reducers are focused on the construction industry. Recently, the oil well cementation industry has also attempted to introduce the polycarboxylic acid dispersants to replace the sulfonated aldehyde ketone condensation polymer dispersants. However, the polycarboxylic acid water reducers in the construction industry cannot be directly used in the oil well cementation industry due to the issues such as temperature resistance and compatibility. The polycarboxylic acid dispersants (which are used as the water reducers in the construction industry) for the oil well cementation industry are not widely patented, because the defects cannot be easily solved that the polycarboxylic acid dispersants lack a high temperature resistance and compatibility with the set retarders, water reducers, early strength agents specialized for the oil well cements. The polycarboxylic acid dispersants currently used in foreign countries generally have a temperature resistance below 120° C., and are often required to be used with the matched water reducers. Therefore, there is an urgent need in the industry to prepare a polycarboxylic acid dispersants having a high temperature resistance, high efficiency, environmentally friendly property and desired compatibility to replace the existing sulfonated aldehyde ketone condensation polymer dispersants.

CN105754045A discloses a silane coupling agent modified polycarboxylic acid water reducer and a preparation method thereof, wherein all examples mention a temperature upper limit of preparation being 45° C. The specific steps are as follows: wherein the raw materials are calculated based on parts by weight: 1) placing 350 parts of polyether macromonomer in a reaction vessel, adding with 5-15 parts of acrylic acid and stirring uniformly, then adding 0.5-5 parts of a double bond-containing silane coupling agent; stirring the solution to a clear state without significant lumping or flaking; wherein the polyether macromonomer is one or more selected from the group consisting of methyl allyl polyoxyethylene ether, isoamyl alcohol polyoxyethylene ether, modified isoamyl alcohol polyoxyethylene ether; 2) dropwise adding the solution obtained in step 1) sequentially under the stirring condition with 2.5-6 parts of an oxidant, 2.5-3.5 parts of an initiator and 20-37 parts of small monomer, the dropwise adding time of the small monomer solution is 1-4 hours; the small monomer is one or more selected from the group consisting of acrylic acid, sodium methallyl sulfonate, 2-acrylamido-2-methylpropanesulfonic acid, itaconic acid, fumaric acid, maleic anhydride; 3) aging the solution obtained in step 2) for 1-2 hours, adding liquid caustic soda for neutralization and stabilizing the pH value at 6; and adding 1 to 3 parts of a silane coupling agent without containing double bond and stirring uniformly. The water reducer prepared in the patent application has a low dispersibility, which is related to the reaction temperature that is not high, and 2-acrylamido-2-methylpropanesulfonic acid is used in the small molecule.

CN107245131A discloses a method for preparing a slump loss-resistant type polycarboxylic acid water reducer by silanizing a terminal group of amino polyether. The method takes a silane coupling agent, a polyether compound, an unsaturated carboxylic acid type monomer and the like as main reaction raw materials, and a polycarboxylic acid water reducer is prepared through firstly hydrolyzing, followed by a Williamson etherification reaction, followed by a condensation and a co-polymerization process, that is, a halosilane coupling agent is initially hydrolyzed, followed by a Williamson etherification reaction with a polyether compound, an etherification product is subjected to condensation with a hydrolysis product of an alkenyl silane coupling agent, the condensation product is then reacted with an unsaturated polyoxyethylene ether, a molecular weight regulator, unsaturated carboxylic acid monomer under the action of an initiator to prepare a polycarboxylic acid water reducer having a plurality of branched silane coupling agent-modified polyether side chains through a free-radical copolymerization reaction. However, the preparation method is complicated.

CN108250370A discloses a polycarboxylic acid and its use in cement, the polycarboxylic acid uses the unsaturated polyether monomers, the unsaturated carboxylic acid monomers and functional monomers as the main reaction raw materials, wherein 3-methacryloxypropyltrimethoxysilane is mentioned as functional monomer, but its dosage is 0-5, preferably 0.5-4 of the molar ratio of the polyester monomer; while in an environment of high temperature use of an oil well cement, after the oil well cement slurry is added with the polycarboxylic acid synthesized with a siliane in a preferably added amount, an use of the polycarboxylic acid under a high temperature (70-150° C., especially 120° C. or higher) will cause swelling of the thickening curve in the thickening test, or even causes that the polycarboxylic acid cannot be used in a serious circumstance.

The literature "Influence of Silanized Polycarboxylate Polymers on Fluidity and Strength Development of Cementitious Material" (Xiangming Kong, et al., Journal of the Chinese Ceramic Society, Vol. 42, No. 5, May. 2014) uses KH570, acrylic acid (AA) monomer, macromonomer HPEG to synthesize silane-modified polycarboxylic acid water reducer by free-radical polymerization reaction, and evaluates its effect on the strength development of the cement mortar. However, the water reducer has poor slump loss-resistance and compatibility, and the HPEG is prone to spoil in summer and cannot be easily stored.

Accordingly, there is a need to find a dispersant that has desired dispersability without delayed coagulation.

SUMMARY OF THE PRESENT DISCLOSURE

In order to solve the above problems existed in the prior art, the present disclosure provides a novel oil well cement dispersant having high temperature resistance and excellent dispersability and significantly reduced retarding property, especially completely does not have the retarding property at a high temperature of higher than 120° C., and having excellent dispersability for use in cooperation with other oil well cement additives at a temperature condition of 120-180° C., and the raw materials, production and use processes are environmentally friendly, thereby overcoming the disadvantages of low efficiency and heavy pollution of the sulfonated aldehyde ketone condensation polymer dispersant, and inferior temperature resistance of the polycarboxylic acid dispersant.

In a first aspect, the present disclosure provides a polymer having a dispersing function, it is characterized in that the polymer comprises a structural unit (a), a structural unit (b) and a structural unit (c); wherein the structural unit (a) is provided by an unsaturated polyether, the structural unit (b) is provided by an unsaturated acid and/or a salt thereof and/or an anhydride thereof, and the structural unit (c) is provided by a silane and/or siloxane comprising a polymerizable group and having no less than five carbon atoms; the molar ratio of the structural unit (a), the structural unit (b) and the structural unit (c) is 1:(1-20):(0.01-0.5); the polymer has a weight average molecular weight of 20,000-90,000.

In a second aspect, the present disclosure provides a method for preparing a polycarboxylic acid cement dispersant comprising: subjecting a monomer mixture to a polymerization reaction in water under the solution polymerization conditions in the presence of an initiator, wherein the monomer mixture comprises a monomer-A which is an unsaturated polyether, a monomer-B which is an unsaturated acid and/or a salt thereof and/or an anhydride thereof, and a monomer-C which is a silane and/or siloxane comprising a polymerizable group and having no less than five carbon atoms; and the molar ratio of the monomer-A, the monomer-B and the monomer-C in the monomer mixture is 1:(1-20):(0.01-0.5); the polymerization conditions cause that the obtained polymer has a weight average molecular weight of 20,000-90,000 g/mol.

In a third aspect, the present disclosure provides an use of the aforementioned polymer or the dispersant prepared with the aforesaid method in cement slurry for well cementation.

Compared with the prior art, the polymer and dispersant provided by the present disclosure comprise the siloxanes having long hydrophobic chains (e.g. having a length of 5-25 carbon atoms), can significantly reduce the retarding property of polycarboxylic acid, especially completely do not have the retarding property at a high temperature of higher than 120° C., while maintaining a higher dispersibility when a higher amount of acid is used. In addition, the dispersant provided by the present disclosure is compatible with other additional additives.

DESCRIPTION OF THE PREFERRED EMBODIMENT

Figure 1:
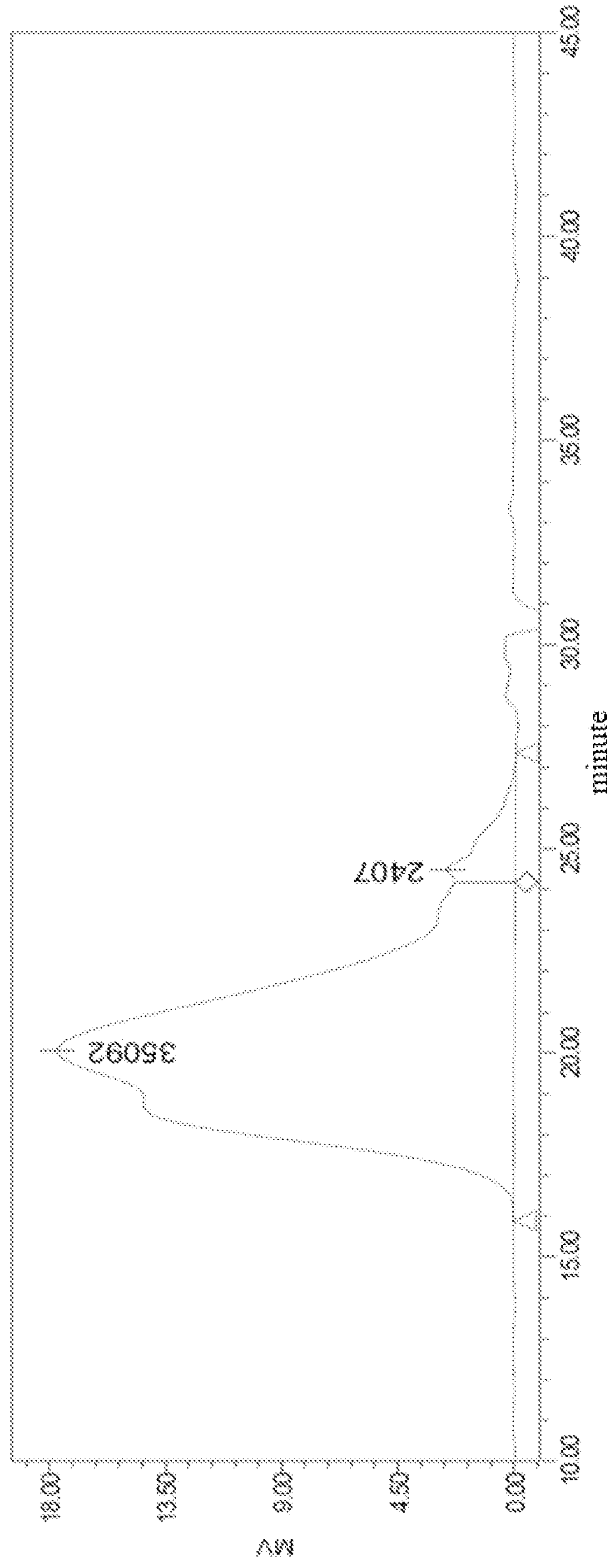
FIG. 1 illustrates a gel chromatographic analysis diagram of the polymer produced in the Example 1.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides a polymer having a dispersing function, it is characterized in that the polymer comprises a structural unit (a), a structural unit (b) and a structural unit (c); wherein the structural unit (a) is provided by an unsaturated polyether, the structural unit (b) is provided by an unsaturated acid and/or a salt thereof and/or an anhydride thereof, and the structural unit (c) is provided by a silane and/or siloxane comprising a polymerizable group and having no less than five carbon atoms; the molar ratio of the structural unit (a), the structural unit (b) and the structural unit (c) is 1:(1-20):(0.01-0.5); the polymer has a weight average molecular weight of 20,000-90,000 g/mol.

In the present disclosure, the polymerizable group may be various groups capable of carrying out the bonding reaction with other monomers under desired conditions, for example, selected from the group consisting of a carbon-carbon double bond, a carbon-carbon triple bond and an epoxy group.

Preferably, the silane and/or siloxane has a structure represented by formula (I):

(I)

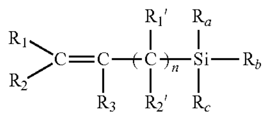

In formula (I), each of $R_1$, $R_2$, $R_3$, $R_1'$ and $R_2'$ is independently selected from H or C1-C4 alkyl; $R_a$, $R_b$ and $R_c$ are each independently selected from H, C1-C4 alkyl or alkoxy, and n is an integer of 5-25, preferably an integer of 8-18.

The silane and/or siloxane used in the present disclosure is a silane or siloxane containing unsaturated double bonds and having no less than 7 carbon atoms, wherein n may be 8, 9, 10, 11, 12, 13, 14, 15, 16, 17, 18, 19, 20, 21, 22, 23, 24 or 25.

In the present disclosure, the C1-C4 alkyl may be methyl, ethyl, n-propyl, isopropyl, n-butyl, isobutyl, or tert-butyl.

In the present disclosure, the C1-C4 alkoxy may be methoxy, ethoxy, n-propoxy, isopropoxy, n-butoxy, isobutoxy, tert-butoxy.

The silane and/or siloxane used in the present disclosure may be, for example, one or more selected from the group consisting of vinyl octadecyl trimethoxysilane (i.e., n in formula (I) is 18, and the similar circumstances are defined below), vinyl hexadecyl trimethoxysilane, vinyl tetradecyl trimethoxysilane, vinyl dodecyl trimethoxysilane, vinyl decyl dimethoxysilane, vinyl octyl dimethoxysilane, 7-octenyl trimethoxysilane, vinyl hexyl dimethoxysilane, vinyl octadecyl dimethoxysilane, vinyl hexadecyl dimethoxysilane, vinyl tetradecyl dimethoxysilane, vinyl dodecyl dimethoxysilane, vinyl decyl dimethoxysilane, vinyl octyl trimethoxysilane, vinyl hexyl dimethoxysilane, vinyl octadecyl trimethysilane, vinyl hexadecyl trimethysilane, vinyl tetradecyl trimethysilane, vinyl dodecyl trimethysilane, vinyl decyl trimethysilane, vinyl octyl trimethysilane, vinyl hexyl trimethysilane, vinyl octadecyl dimethysilane, vinyl hexadecyl dimethysilane, vinyl tetradecyl dimethysilane, vinyl dodecyl dimethysilane, vinyl decyl dimethysilane, vinyl octyl dimethysilane, vinyl hexyl dimethysilane, propenyl octadecyl trimethoxysilane, propenyl hexadecyl trimethoxysilane, propenyl tetradecyl trimethoxysilane, propenyl dodecyl trimethoxysilane, propenyl decyl dimethoxysilane, propenyl octyl dimethoxysilane, propenyl hexyl dimethoxysilane; propenyl octadecyl dimethoxysilane, propenyl hexadecyl dimethoxysilane, propenyl tetradecyl dimethoxysilane, propenyl dodecyl dimethoxysilane, propenyl decyl dimethoxysilane, propenyl octyl dimethoxysilane, propenyl hexyl dimethoxysilane, propenyl octadecyl trimethylsilane, propenyl hexadecyl trimethylsilane, propenyl tetradecyl trimethylsilane, propenyl dodecyl trimethylsilane, propenyl decyl trimethylsilane, propenyl octyl trimethylsilane, propenyl hexyl trimethylsilane, propenyl octadecyl dimethylsilane, propenyl hexadecyl dimethylsilane, propenyl tetradecyl dimethylsilane, propenyl dodecyl dimethylsilane, propenyl decyl dimethylsilane, propenyl octyl dimethylsilane and propenyl hexyl dimethylsilane.

In the present disclosure, the expression "the structural unit (a) is provided by unsaturated polyether" refers to a structural unit pattern formed by opening the double bond of unsaturated polyether and carrying out polymerization. The other structural units have a similar circumstance.

In the present disclosure, the weight average molecular weight of the polymer is preferably within a range of 25,000-55,000 g/mol. The weight average molecular weight is measured by the Gel Permeation Chromatography (GPC) method.

According to some embodiments of the present disclosure, a molar ratio of the structural unit (a), the structural unit (b) and the structural unit (c) is 1:(4-12):(0.05-0.3).

The silane and/or siloxane in the polymer of the present disclosure are used in a small amount, it can effectively avoid a circumstance of crosslinking the silanes (or siloxanes) which may occur in the presence of large amount of the silane and/or siloxane, thereby effectively preventing the cement slurries from thickening when the polymer is used as a cement dispersant.

In the present disclosure, the presence and molar content of the structural unit (a), the structural unit (b) and the structural unit (c) can be measured by the infrared spectroscopy in combination with the Hydrogen Nuclear Magnetic Resonance ($^1$H-NMR) method.

According to some embodiments of the present disclosure, the polymer has a comb-shaped structure. The comb-shaped structure refers to that the structure formed by polymerization of carbon-carbon double bonds is a skeletal structure, and the structure of each structural unit connected with the carbon-carbon double bonds forms a pendulous structure similar to a comb tooth.

In accordance with some embodiments of the present disclosure, the polymer is a random copolymer. It can be verified that the polymer in the present disclosure is a random copolymer based on that a DSC peak of the polymer is a single peak.

According to some embodiments of the present disclosure, the unsaturated polyether has a structure represented by formula (2):

(2)

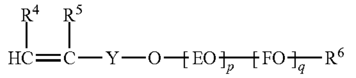

in formula (2),

E denotes an alkylene having 2-4 carbon atoms, such as $-CH_2CH_2-$, $-CH_2CH_2CH_2-$, $-CH_2CH_2CH_2CH_2-$, $-CH_2CH(CH_3)-$, $-CH_2C(CH_3)_2-$, $-CH(CH_3)CH(CH_3)-$;

F denotes an alkylene having 2-4 carbon atoms and different from E;

$R^4$ and $R^5$ each independently denotes H or an alkyl having 1-5 carbon atoms, preferably methyl;

$R^6$ denotes an alkyl having 1-4 carbon atoms;

Y denotes an alkylene having 1-5 carbon atoms;

p denotes an integer of 0-200, preferably an integer of 20-140;

q denotes an integer of 0-200, preferably an integer of 20-140;

p+q>10, preferably p+q≥40.

In the present disclosure, the alkyl having 1-5 carbon atoms may be methyl, ethyl, propyl, isopropyl, butyl, isobutyl, tert-butyl, pentyl.

According to some embodiments of the present disclosure, the unsaturated polyether is at least one selected from the group consisting of methyl allyl polyoxyethylene ether (HPEG), methyl allyl polyoxypropylene ether, isopentenylpolyoxyethylene ether (TPEG) and isobutylene polyoxyethylene ether.

According to some embodiments of the present disclosure, the unsaturated carboxylic acid has a structure represented by formula (II):

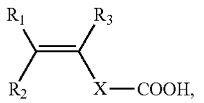

(II)

In formula (II), each of $R_1$, $R_2$ and $R_3$ is independently selected from hydrogen, C1-C6 alkyl or —COOH, X is $(CH_2)_n$, and n is 0, 1, 2, 3, 4, 5 or 6.

According to some embodiments of the present disclosure, "unsaturated acid or a salt thereof or an anhydride thereof" refers to unsaturated acid, or a sodium salt, potassium salt, ammonium salt of unsaturated acid, or an anhydride of unsaturated acid. Preferably, the unsaturated acid is at least one selected from the group consisting of acrylic acid, methacrylic acid, vinylsulfonic acid, vinylphosphoric acid, maleic acid, itaconic acid, fumaric acid, 2-acrylamido-2-methylpropanesulfonic acid, styrenesulfonic acid and propenylsulfonic acid.

In the present disclosure, the content of each structural unit in the polymer and the structural characteristic of the polymer can be tested by using the conventional methods known in the prior art, for example, the content and structural characteristic are characterized by the infrared spectroscopy, nuclear magnetism, gel chromatography, TGA-DSC and the like. In particular, for instance, with respect to the infrared spectroscopy, the wave numbers 3442 $cm^{-1}$ and 1110 $cm^{-1}$ correspond to —OH and —C—O—C— of the unsaturated polyether monomer (e.g., TPEG), 2882 $cm^{-1}$ corresponds to $—CH_3$; 1593 $cm^{-1}$ corresponds to —COO— of the unsaturated acid (e.g., acrylic acid); 1465 $cm^{-1}$ and 2882 $cm^{-1}$ correspond to $—CH_2—$ in the long chain of the long straight chain silanes and/or silaoxanes, 1347 $cm^{-1}$ corresponds to —Si—C—, 1100 $cm^{-1}$ corresponds to —C—O— or —Si—O—; in addition, no absorption peak between 1645-1620 $cm^1$ represents that there is not the remaining "—C═C—". The content of each structural unit and the number of $—CH_2—$ in the long chain of the long straight chain silanes and/or silaoxanes can be quantified by an area of the peaks at different sites in the hydrogen nuclear magnetic resonance spectrogram.

The temperature corresponding to the peaks in the Thermogravimetric analysis (TGA) indicates the thermal stability of the polymer.

The molecular weight of the polymer and its distribution are measured by the Gel Permeation Chromatography (GPC) analysis.

The aforesaid polymer may be used as a cement dispersant, and the properties of a cement slurry can be optimized by adjusting the used amount of the dispersant; the polycarboxylic acid cement dispersant has a thickening index not more than 1.5, preferably within a range of 1-1.35 at a temperature of 120° C. or more; a 24 h compressive strength index not less than 0.8, preferably within a range of 0.95-1.1, more preferably within a range of 1.0-1.1 at a temperature of 110° C.; a consistency coefficient not more than 0.8, preferably within a range of 0.4-0.75 at a temperature of 85° C.; and a liquidity index n not less than 0.6, preferably within a range of 0.7-0.95 at a temperature of 85° C. When the polymer provided by the present disclosure is used as a cement dispersant, it not only has controllable retarding properties and compatibility with other additives at 120° C., the higher is the temperature, the better is controllability of the delayed coagulation, and the shorter is the thickening time, such as the thickening index within a range of 0.95-1.5, preferably within a range of 0.98-1.2 at a temperature of 150° C., thus the polymer is extremely suitable for use in the high temperature operating environments.

In the present disclosure, the thickening index refers to the ratio of the thickening time of a cement base slurry after addition of a cement dispersant relative to the thickening time of the cement base slurry before addition of a cement dispersant. The cement base slurry may be the slurry obtained by mixing various cement for well cementation with water.

In the present disclosure, the thickening time, the consistency coefficient K, the liquidity index n and the compressive strength are measured according to the National Standard GB/T 19139-2003 of China.

As can be seen from the above data, when the polymer provided in the present disclosure is used as a polycarboxylic acid cement dispersant, it has little retarding properties at high temperatures, thus can meet different application requirements, for example, for use in well cementing, conventional construction, and the various cement application circumstances that require or do not require the delayed coagulation.

Preferably, a content of the polymer is within a range of 10-90 wt %, preferably 20-40 wt %, based on the total amount of the polycarboxylic acid cement dispersant. Wherein the total amount of the polycarboxylic acid cement dispersant includes the amount of the solvent used in the polymerization reaction.

Preferably, the polymer content is not less than 90 wt %, further preferably 95 wt % or more, relative to the solid content of the polycarboxylic acid cement dispersant.

In a second aspect, the present disclosure provides a method for preparing a dispersant comprising: subjecting a monomer mixture to a polymerization reaction in water under the solution polymerization conditions in the presence of an initiator, wherein the monomer mixture comprises a monomer-A which is an unsaturated polyether, a monomer-B which is an unsaturated acid and/or a salt thereof and/or an anhydride thereof, and a monomer-C which is a silane and/or siloxane comprising a polymerizable group and having no less than five carbon atoms; and the molar ratio of the monomer-A, the monomer-B and the monomer-C in the monomer mixture is 1:(1-20):(0.01-0.5); the polymerization conditions cause that the obtained polymer has a weight average molecular weight of 20,000-90,000, preferably 25,000-55,000 g/mol.

The molar ratio of the monomer-A, the monomer-B and the monomer-C is 1:(4-12):(0.05-0.3).

The monomer-A, the monomer-B and the monomer-C have been described above and will not be repeatedly described herein.

In the present disclosure, the silane coupling agent may be prepared in a conventional manner in the technical field, for example, initially reacting a Grignard reagent having a structure represented by the formula (I') with tetrachlorosilane to obtain a long-chain chlorosilane, and then subjecting the obtained long-chain chlorosilane to an alcoholysis to produce the silane coupling agent of the present disclosure. Wherein the preparation conditions of the silane coupling agent are not particularly limited, provided that the requirements of the present disclosure can be satisfied.

(I')

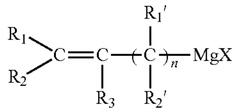

In formula (I'), $R_1$, $R_2$, $R_3$, $R_1'$, $R_2'$, $R_a$, $R_b$, $R_c$ and n are defined in in the same manner as those in formula (I). The corresponding long-chain silanes can be obtained either by reacting the long-chain chlorosilanes with a Grignard reagent (a magnesium hydrocarbyl halide (R—MgX)), for example, the corresponding long-chain silanes can be obtained through the reaction $Cl(CH_2)_{16}SiH(CH_3)_2$+$H_2C{=}CH{-}CH_2MgCl \rightarrow H_2C{=}CH{-}CH_2{-}(CH_2)_{16}SiH(CH_3)_2$+$MgCl_2$.

Although the long-chain silanes may be voluntarily developed and produced, the specific reaction conditions are well-known among those skilled in the art, the content will not be described in detail herein. Unless otherwise specified, the silane coupling agents used in the examples of the present disclosure are prepared with the methods well-known among those skilled in the art.

According to some embodiments of the present disclosure, the polymerization reaction conditions comprise a temperature of 40-80° C., preferably 50-70° C.; and a time of 1-10 hours, preferably 2-8 hours.

According to some embodiments of the present disclosure, the initiator is at least one selected from the group consisting of hydrogen peroxide-ascorbic acid (oxidant-reducing agent), sodium bisulfite, sodium formaldehyde sulfoxylate and sodium dithionite, wherein the oxidant is at least one selected from the group consisting of hydrogen peroxide, peroxyacetic acid, ammonium persulfate, sodium persulfate and potassium persulfate. Preferably, the concentration of hydrogen peroxide is within a range of 25-35 wt %.

According to some embodiments of the present disclosure, the initiator is contained in an amount of 0.01-2 wt %, preferably 0.1-1 wt % of the total amount of the monomer mixture.

According to some embodiments of the present disclosure, the polymerization is carried out in the presence of a chain transfer agent. The used amount of chain transfer agent is not particularly limited, provided that it can meet the requirements of the present disclosure, for example, the chain transfer agent may be used in an amount of 0.01-2 wt. % based on the total amount of the monomer mixture.

In the present disclosure, the chain transfer agent is selected from mercaptoacetic acid and/or 3-mercaptopropionic acid.

In the present disclosure, the further post-treatment is not performed after the polymerization reaction, the polymerized material (including the solvent) can be directly used as a cement slurry dispersant. However, when the relevant structural characterizing is performed, the polymer may be subjected to a corresponding purification process according to the characterization requirements.

According to a preferred embodiment of the present disclosure, in order to prevent the auto-polymerization and the explosive-polymerization, and ensure a more uniform and regular comb-shaped structure, the specific operations in the method of the present disclosure comprise: a solution containing an oxidant, a solution containing unsaturated acid or a salt thereof or an anhydride thereof, a silane coupling agent (a silane and/or siloxane comprising a polymerizable group and having no less than five carbon atoms), and a solution containing an initiator and a chain transfer agent are simultaneously and dropwise added into a solution containing unsaturated polyether, respectively, and the polymerization reaction is performed under the polymerization conditions.

In the present disclosure, when the dropwise adding mode is adopted, the time of the polymerization reaction includes the dropwise adding time, that is, the time of the polymerization reaction is counted from a start of the dropwise adding. Preferably, in order to make the polymerization to be performed in a more sufficient manner, the reaction is continued for 0.5-1.5 hours with the heat preservation after the completion of the dropwise adding of the materials.

According to some embodiments of the present disclosure, the solution containing an unsaturated acid and/or a salt thereof and/or an anhydride thereof has a dropwise adding time of 2-4 hours, the silane coupling agent and the solution containing unsaturated polyether has a dropwise adding time of 2-4 hours, the solution containing an initiator and a chain transfer agent and the solution containing an unsaturated polyester have a dropwise adding time of 2.5-4.5 hours.

In the present disclosure, the concentration of the oxidant in the solution containing the oxidant is 9-40 wt %.

In the present disclosure, the total concentration of unsaturated acid and/or a salt thereof and/or an anhydride thereof in the solution containing an unsaturated acid and/or a salt thereof and/or an anhydride thereof is 2-80 wt %.

In the present disclosure, the concentration of the initiator is 1-10 wt %, and the concentration of the chain transfer agent is 1-10 wt %, preferably 2-6 wt %, in the solution containing the initiator and the chain transfer agent.

In the present disclosure, the concentration of unsaturated polyether in the solution containing unsaturated polyether is 10-60 wt %.

In the present disclosure, the solvent in the solution containing the oxidant, the solution containing an unsaturated acid and/or a salt thereof and/or an anhydride thereof, the solution containing the initiator and the chain transfer agent, and the solution containing an unsaturated polyether monomer may be water.

According to a further preferred embodiment of the present disclosure, the method comprises the following steps:

(1) adding unsaturated polyether and deionized water into a reaction kettle, and stirring sufficiently and mixing uniformly;

(2) starting the temperature rise process, raising the temperature to 50-70° C., and holding the temperature until the end of the reaction;

(3) adding the oxidizer or initiator to deionized water, stirring uniformly, then adding the mixture to the reaction kettle;

(4) formulating a mixed aqueous solution of the reducing agent or the initiator and the chain transfer agent: adding the reducing agent or the initiator and the chain transfer agent into deionized water and subjecting to sufficiently stirring and dissolving;

(5) formulating an aqueous solution of unsaturated acid and/or a salt thereof and/or an anhydride thereof in deionized water: adding an unsaturated acid and/or a salt thereof and/or an anhydride thereof into deionized water and sufficiently stirring and dissolving with sufficient stirring;

(6) simultaneously dropwise adding an aqueous solution containing unsaturated acid and/or a salt thereof and/or an anhydride thereof, the silane and/or siloxane and a mixed aqueous solution containing the initiator and chain transfer agent; the dropwise adding time of the first two materials is 2-4 hours, the dropwise adding time of the mixed aqueous solution of initiator and chain transfer agent is 2.5-4.5 hours;

(7) after the completion of dropwise adding operation, the heat preservation and stirring are continued for 0.5-1 hours, the materials are then cooled down and discharged.

The present disclosure also provides an oil well cement dispersant produced with the aforesaid preparation method. As described above, the dispersant provided by the present disclosure has desirable dispersability and lower retarding properties, and can be compatible with other additives and adjuvants and used in various application circumstances, so as to realize the various uses.

In the present disclosure, the dispersant is preferably used in an amount of 0.1-5 wt % of the weight of the cement slurry.

The favorable effects of the present disclosure are at least reflected in the following aspects:

1. The present disclosure provides a polymer having a dispersing function, which contains long straight chain silane or siloxane structural units, can reduce the delayed coagulation effect produced by the carboxylic acid with equal adsorption amount while increasing the anchoring sites; therefore, when the polymer is used as a dispersant, the polymer has an excellent dispersibility and significantly reduced retarding property when compared with the dispersant purely using carboxylic acid groups as the adsorbing groups; when compared with the short chain silane coupling agents having less than 5 carbon atoms conventionally used in the art, the polymer has the advantages of smaller retarding property or completely do not have the retarding property, and the better compatibility with other additives and adjuvants such as a filtrate reducer, a set retarder. The dispersant is effective in preventing agglomeration of cement particles and improving the flowing property of cement slurries, with an applicable temperatures up to 150° C.
2. The dispersant of the present disclosure adopts polyether macromonomer as a framework, and the obtained polycarboxylic acid dispersant has a comb-shaped structure, which can significantly improve the dispersion efficiency and withstand higher temperature than the polyester.
3. The polymer of the present disclosure can adopt higher carboxylic acid content, thus can greatly improve the dispersion efficiency when used as a dispersant, lower the retarding property from the viewpoint that the hydrophobic long chains reduce the surface hydration film integrity of cement particles; in addition, the present disclosure adopts different technical thinking to solve the contradictory problems of the dispersing efficiency and the retarding property of carboxylic acids, compared to the case where 2-acrylamido-2-methylpropanesulfonic acid is used for replacing a portion of carboxylic acid in the previous inventions to reduce the retarding property of carboxylic acids.
4. Experiments have demonstrated that the dispersant of the present disclosure has less retarding property or do not have the retarding property at higher temperatures, for example, when compared with the thickening time of the base slurry per se, a change of thickening time at a temperature of 150° C. is smaller than that at a temperature of 120° C., it illustrates that the dispersant of the present disclosure can not only be used in high temperature environment, but also has a lower retarding property and better effects at high temperature.

In order to ensure that the present disclosure can be easily understood, the present disclosure will be described in detail with reference to the following examples, which only serve to illustrate the present disclosure, instead of imposing limitation on the application scope of the present disclosure.

The materials used in the present disclosure are commercially available products.

In the following Examples and Comparative Examples, the amount of each structural unit in the polymer was determined according to the feeding quantity of monomers, and in particular, the feeding ratio of the monomers actually participating in the polymerization were determined by testing the amounts of unreacted monomers, such that the content of each structural unit in the polymer was determined; the solid content was calculated and obtained according to the feeding quantity, that is, the solid content=the feeding quantity (weight) excluding the solvent/the feeding quantity (weight) including the solvent*100%. In the Examples, only a single peak was illustrated in the DSC spectrogram of the polymers, indicating that each of the polymers was random copolymer.

Example 1

100 g (0.0417 mol) of TPEG 2400 and 150 g of deionized water were added into a round bottom flask, stirred and heated to 70° C. 1.5 g of hydrogen peroxide was added into 15 g of deionized water, stirred uniformly and then poured to the reaction kettle. 0.7 g of ascorbic acid and 1 g of 3-mercaptopropionic acid were added into 17 g of deionized water to prepare a mixed aqueous solution of an initiator and a chain transfer agent; 37 g of acrylic acid (AA) was added into 40 g of deionized water to prepare an aqueous acrylic acid solution; the mixed aqueous solution containing an initiator and a chain transfer agent, 5 g of vinyl octadecyl trimethoxysilane, an aqueous acrylic acid solution were simultaneously and dropwise added into the round bottom flask respectively; a peristaltic pump was used for controlling that the dropwise adding of the aqueous acrylic acid solution and the vinyl octadecyl trimethoxysilane was respectively completed at 4 hours, and the dropwise adding of the mixed aqueous solution containing an initiator and a chain transfer agent was completed at 4.5 hours. After the dropwise adding of all the materials was completed, the stirring and heat preservation were continued for 0.5 hour, in order to prepare a high temperature type polycarboxylic acid oil well cement dispersant sample S1 with an actual solid content of 39.8 wt %.

Figure 2:
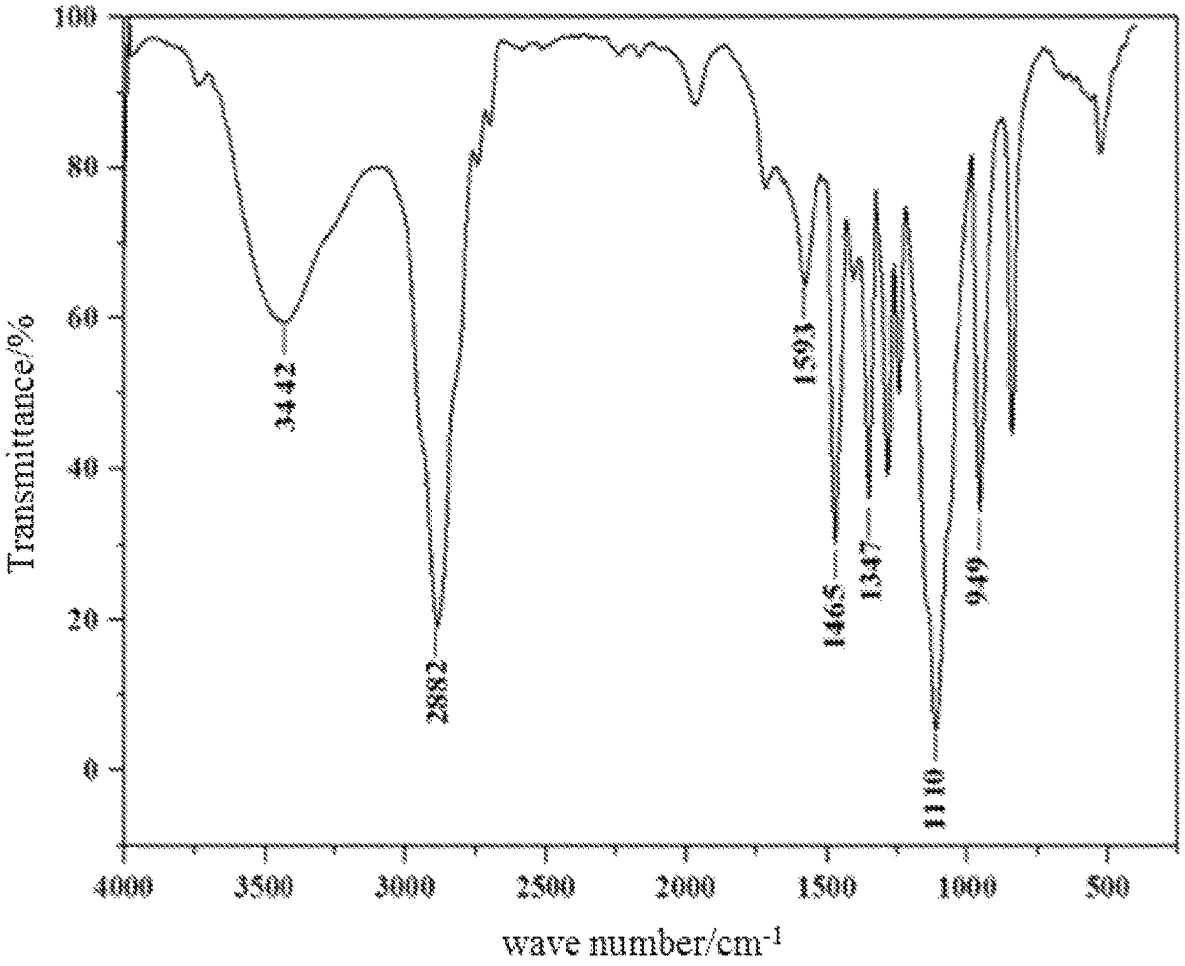
FIG. 2 illustrates an infrared spectrogram of the polymer produced in Example 1.

The sample S1 was subjected to structure characterization, wherein the purified sample was used in the nuclear magnetic resonance spectrogram:

Gel chromatography analysis (FIG. 1): the polymer had a weight average molecular weight of 35,000 g/mol;

Infrared spectroscopy testing (FIG. 2): polyether TPEG: the wave numbers 3442 cm-1 and 1110 $cm^{-1}$ corresponded to —OH and —C—O—C—, 2882 $cm^{-1}$ corresponded to —$CH_3$; acrylic acid: 1593 $cm^{-1}$ corresponded to —COO—; long-chain silane: 1461 $cm^{-1}$ and 2882 $cm^{-1}$ corresponded to —$CH_2$— of the long straight chain, 1347 $cm^{-1}$ corresponded to —Si—C—, 1100 $cm^{-1}$ corresponded to —C—

Figure 3:
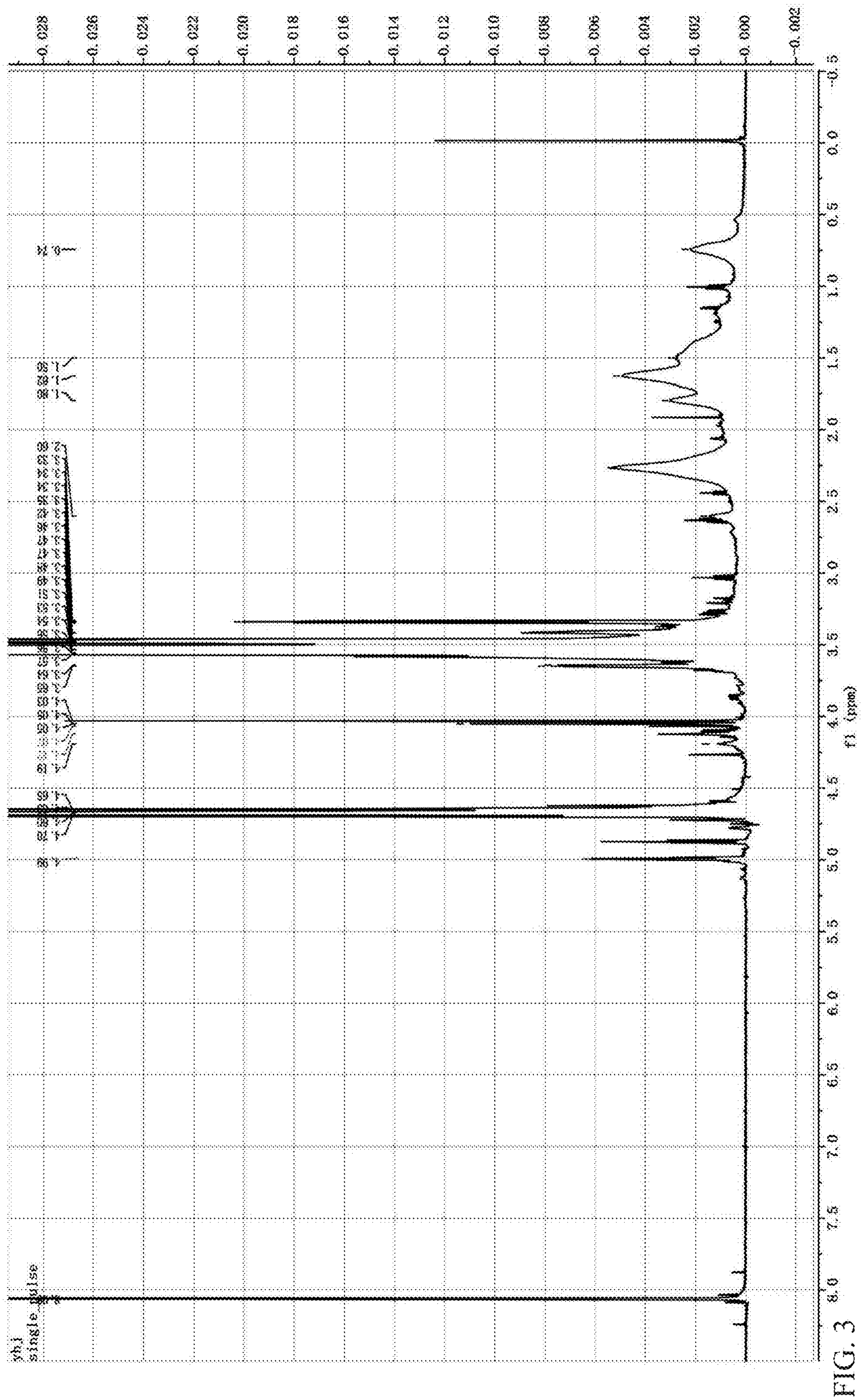
FIG. 3 illustrates a Hydrogen Nuclear Magnetic Resonance (H-NMR) spectrogram of the polymer produced in Example 1.
Figure 4:
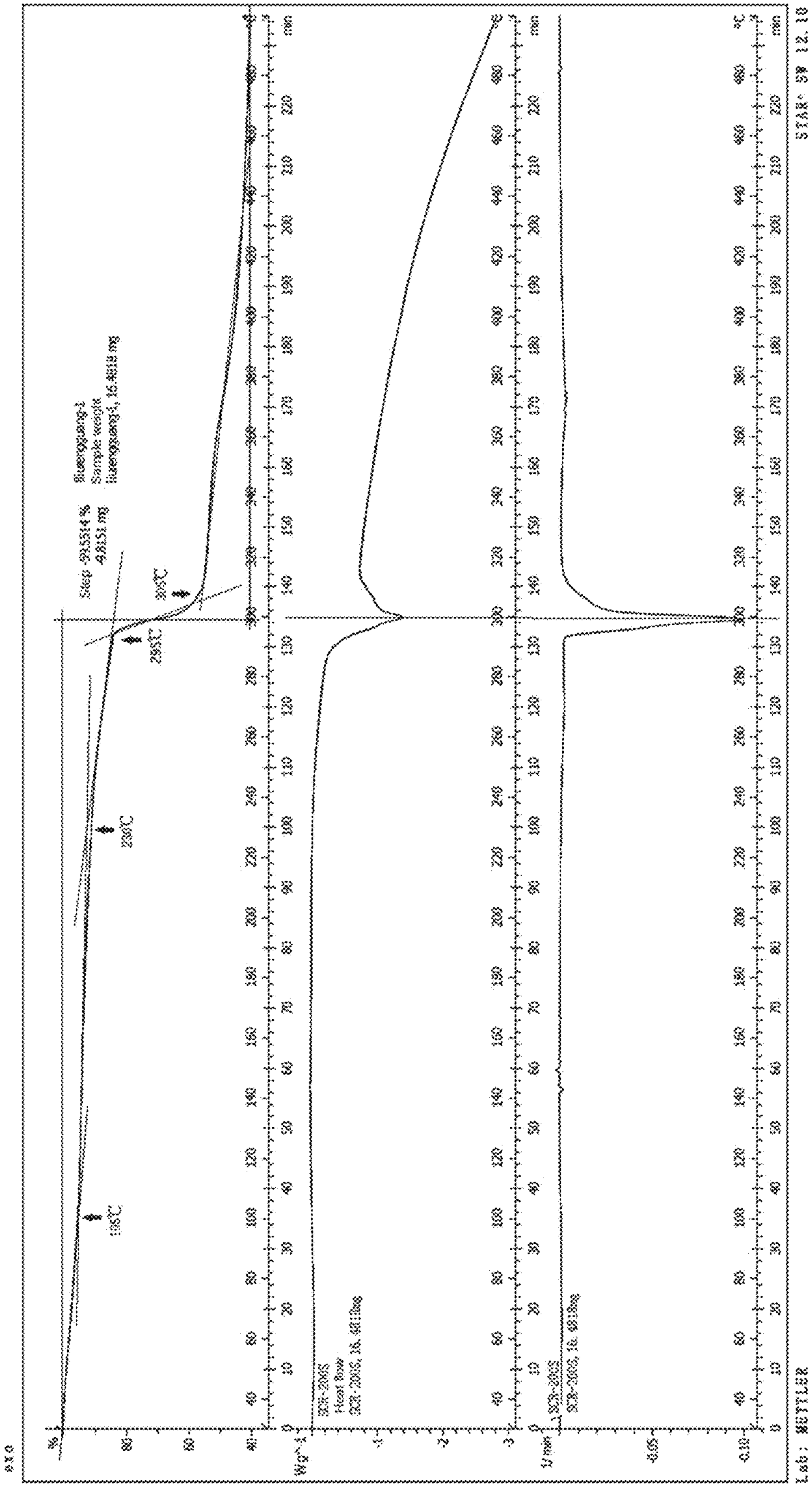
FIG. 4 illustrates a thermogravimetric analysis graph of the polymer produced in Example 1.
Figure 5:
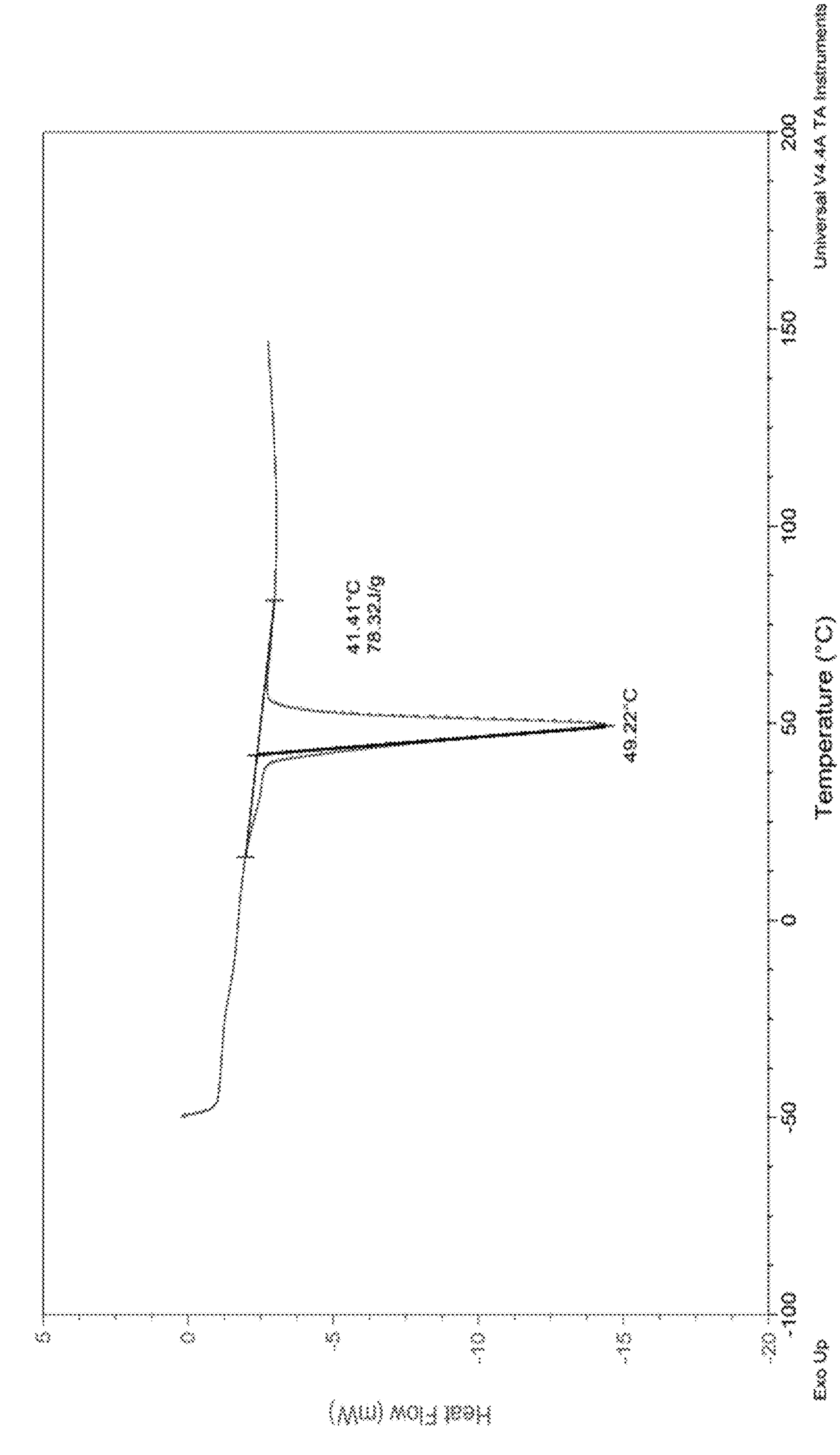
FIG. 5 illustrates a DSC spectrogram of the polymer produced in Example 1.

O—C— or —Si—O—Si—, there was no residual double bonds: —C=C— was not presented between 1645-1620 $cm^{-1}$;

Hydrogen nuclear magnetic resonance spectrum (FIG. 3): characteristic proton absorption peaks at 0 ppm corresponded to a siloxane; 0.74 ppm corresponded to side chain terminal group —$CH_3$; 1.20 ppm corresponded to —$CH_2$ of the long-chain silane; 1.62 ppm and 2.26 ppm corresponded to methyl and methine of the acrylic acid (AA) respectively; 3.73 ppm corresponded to —$CH_2$—$CH_2$—O— in TPEG; 4.69 ppm corresponded to the water peak;

Thermogravimetric analysis test (FIG. 4): the absorption peak only occurred at the temperature of 295° C., it indicated a desired high temperature resistance;

In the DSC spectrogram, a single peak appeared at the temperature of 49.22° C., it indicated that the polymer was a random copolymer.

Example 2

100 g of TPEG1500 and 160 g of deionized water were added into a round bottom flask, stirred and heated to 50° C. 0.5 g of hydrogen peroxide was added into 5 g of deionized water, stirred uniformly and then poured to the reaction kettle. 0.25 g of ascorbic acid and 0.2 g of 3-mercaptopropionic acid were added into 5.5 g of deionized water to prepare a mixed aqueous solution containing an initiator and a chain transfer agent; 34.6 g of itaconic acid (IA) was added into 34 g of deionized water to prepare an aqueous itaconic acid solution; the mixed aqueous solution containing an initiator and a chain transfer agent, 0.85 g of vinyl octyl trimethoxysilane, an aqueous itaconic acid solution were simultaneously and dropwise added into the round bottom flask respectively; a peristaltic pump was used for controlling that the dropwise adding of the aqueous itaconic acid solution and the vinyl octyl trimethoxysilane was respectively completed at 2 hours, and the dropwise adding of the mixed aqueous solution of an initiator and a chain transfer agent was completed at 2.5 hours. After the dropwise adding of all the materials was completed, the stirring and heat preservation were continued for 1 hour, in order to prepare a high temperature type polycarboxylic acid oil well cement dispersant sample S2 with an actual solid content of 39.7 wt %. Gel chromatography was used for determining that the polymer had a weight average molecular weight of 29,340 g/mol.

Example 3

100 g (0.025 mol) of HPEG 4000 and 140 g of deionized water were added into a round bottom flask, stirred and heated to 65° C. 0.9 g of hydrogen peroxide was added into 4.5 g of deionized water, stirred uniformly and then poured to the reaction kettle. 0.35 g of ascorbic acid and 0.8 g of 3-mercaptopropionic acid were added into 11 g of deionized water to prepare a mixed aqueous solution containing an initiator and a chain transfer agent; 14.4 g of acrylic acid (AA) was added into 22 g of deionized water to prepare an aqueous acrylic acid solution; the mixed aqueous solution containing an initiator and a chain transfer agent, 1.85 g of vinyl octadecyl dimethysilane, an aqueous acrylic acid solution were simultaneously and dropwise added into the round bottom flask respectively; a peristaltic pump was used for controlling that the dropwise adding of the aqueous acrylic acid solution and the vinyl octadecyl dimethysilane was respectively completed at 3 hours, and the dropwise adding of the mixed aqueous solution containing an initiator and a chain transfer agent was completed at 3.5 hours. After the dropwise adding of all the materials was completed, the stirring and heat preservation were continued for 1 hour, in order to prepare a high temperature type polycarboxylic acid oil well cement dispersant sample S3 with an actual solid content of 39.6 wt % was produced. Gel chromatography was used for determining that the polymer had a weight average molecular weight of 31,090 g/mol.

Example 4

The cement dispersant was prepared according to the method of Example 1, except that the step of adding 37 g acrylic acid (AA) into 40 g of deionized water in Example 1 was replaced by adding 3 g acrylic acid (AA) into 74 g of deionized water to produce an aqueous acrylic acid solution. An oil well cement dispersant sample S4 having an actual solid content of 39.8 wt % was produced. Gel chromatography was used for determining that the polymer had a weight average molecular weight of 34,222 g/mol.

Example 5

The cement dispersant was prepared according to the method of Example 1, except that the step of adding 37 g acrylic acid (AA) into 40 g of deionized water in Example 1 was replaced by adding 62 g acrylic acid (AA) into 15 g of deionized water to produce an aqueous acrylic acid solution. An oil well cement dispersant sample S5 having an actual solid content of 39.8 wt % was produced. Gel chromatography was used for determining that the polymer had a weight average molecular weight of 36,143 g/mol.

Example 6

The cement dispersant was prepared according to the method of Example 3, except that the vinyl octadecyl dimethysilane was replaced with an equimolar amount of 7-octenyl trimethoxysilane. An oil well cement dispersant sample S6 having an actual solid content of 39.6 wt % was produced. Gel chromatography was used for determining that the polymer had a weight average molecular weight of 33,412 g/mol.

Example 7

The cement dispersant was prepared according to the method of Example 3, except that the vinyl octadecyl dimethysilane was used in an amount of 0.2 g. An oil well cement dispersant sample S7 having an actual solid content of 39.5 wt % was produced. Gel chromatography was used for determining that the polymer had a weight average molecular weight of 35,898 g/mol.

Comparative Example 1

The cement dispersant was prepared according to the method of Example 3, except that the vinyl octadecyl dimethysilane was replaced with an equimolar amount of KH-570. An oil well cement dispersant comparison sample D1 having an actual solid content of 39.8 wt % was produced. Gel chromatography was used for determining that the polymer had a weight average molecular weight of 32,347 g/mol.

Test Example

Figure 6:
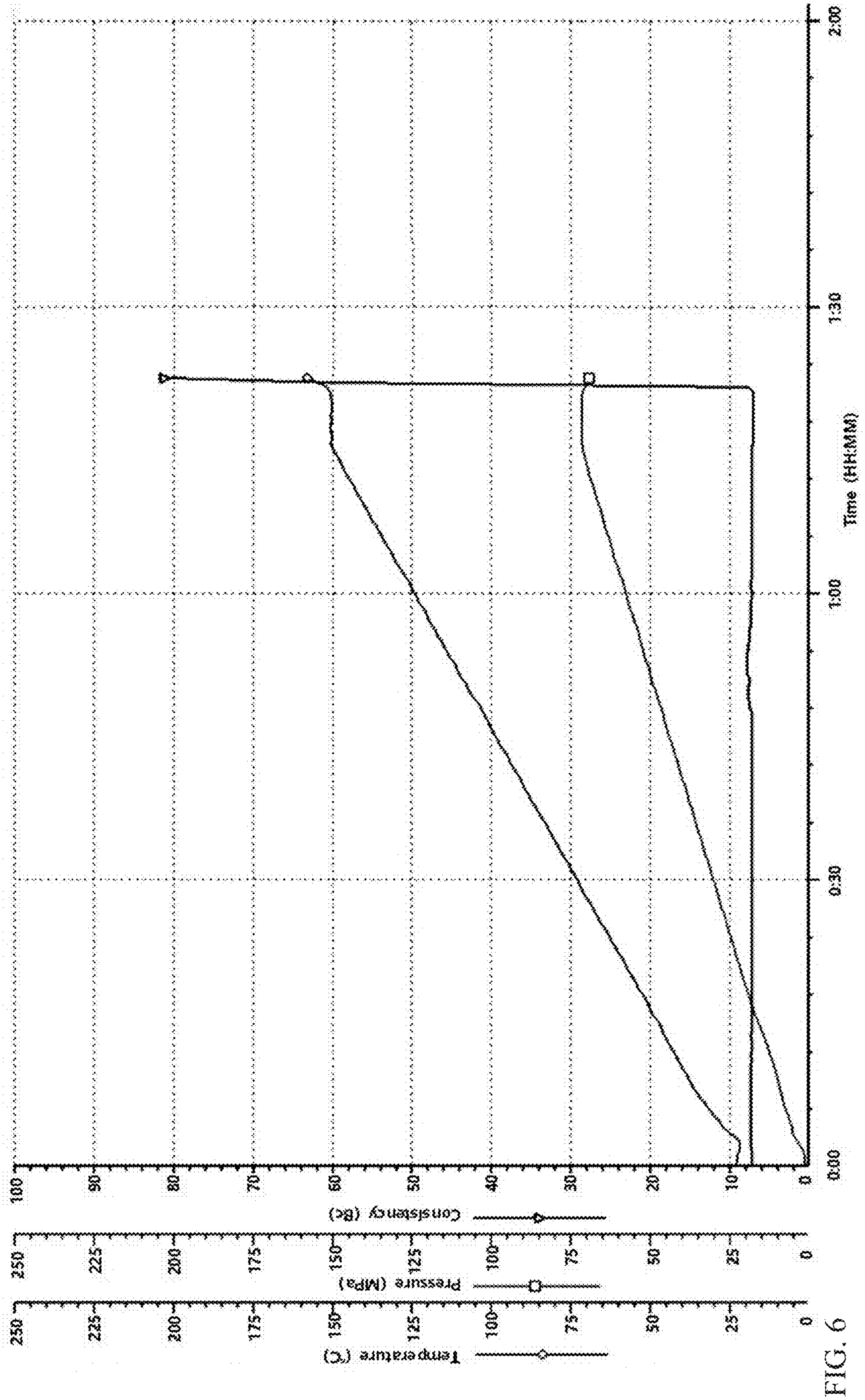
FIG. 6 illustrates a thickening linearity diagram of the dispersant produced in Example 1 in the cement slurries of Table 3 at 150° C.

A cement slurry was prepared according to the National Standard GB/T 19139-2003 of China; the rheological properties, stability, thickening time and compressive strength of the cement slurry were evaluated, the technical indicators were shown in Table 1; the results of the samples of Examples 1-7 and Comparative Examples 1-2 in the different base slurry systems were shown in Table 2, Table 3 (the mixing amount of each dispersant was 0.5% by mass of the cement, FIG. 6 illustrated a thickening linearity diagram of the dispersant produced in Example 1 in the cement slurries of Table 3 at 150° C.) and Table 4, wherein the ratio of thickening time was determined at the temperatures of 120° C. and 150° C. to demonstrate that the dispersant of the present disclosure overcame the delayed coagulation defect of the polycarboxylic acid dispersants at a high temperature. The cement in use was grade G cement manufactured by the Sichuan Jiahua Cement Plant, and the filtrate reducer and the retarder were the SCF-180 L filtrate reducer and the SCR-3 retarder purchased from the Sinopec Research Institute of Petroleum Engineering Co., Ltd, wherein the filtrate reducer was a 2-acrylamide-2-methylpropanesulfonic Acid (AMPS)-based filtrate reducer, the retarder was an acidic retarder; the comparative dispersant (Comparative Example 2) was the dispersant commercially available from BASF of Germany, the dispersant was a polycarboxylic acid dispersant. The formulation of base slurry I was 100 parts by weight of cement+44 parts by weight of water; the formulation of base slurry II was 100 parts by weight of cement+4 parts by weight of filtrate reducer+40 parts by weight of water; the formulation of base slurry III was 450 g of cement+225 g of silicon powder+225 g of weighting material micro manganese powder+31.5 g of filtrate reducer+27 g of nanometer liquid silicon+27 g of latex+14 g of retarder+2.3 g of dispersant+200 g of on-site water.

The liquidity index n of a cement slurry was used for measuring the rheological properties of the cement slurry, the larger was the liquidity index n, the better was the fluidity; the consistency coefficient K was used as a measure of the viscosity of a fluid, the greater was the consistency coefficient K, the thicker was the cement slurry, the poorer was the fluidity; the thickening index indicated a ratio of thickening time (minutes) for a cement slurry added with a dispersant relative to the thickening time (minutes) for a blank slurry which was not added with a dispersant.

TABLE 1

Performance requirements of using the dispersant cement slurry and the set cement at a temperature higher than 80° C.

| Test items | | Technical indicators |
|---|---|---|
| Ratio of thickening time (85° C., 70.3 MPa) | | 1.0-2.0 |
| Ratio of compressive strength at 24 h (110° C., 20.7 MPa) | | ≥0.8 |
| Rheological properties | Liquidity index n | ≥0.50 |
| (85° C. normal pressure) | Consistency coefficient K, Pa · $s^n$ | ≤0.70 |
| Thickening linearity | | Normal |

Note 1:
ratio of thickening time refers to the ratio of the thickening time of a cement slurry added with a drag reducer relative to the thickening time of a pure cement slurry;
Note 2:
ratio of compressive strength refers to the ratio of the compressive strength of set cement added with a drag reducer relative to the compressive strength of set cement of a pure cement slurry;
Note 3:
the contents in parentheses were experimental conditions

TABLE 2

| Source of dispersants | Liquidity index n | Consistency coefficient K | Thickening time, min (temperature rise rate of 2° C./min) | | Thickening index (ratio of thickening time) | Compressive strength at 24 h, MPa | Compressive index at 24 h | Thickening linearity |
|---|---|---|---|---|---|---|---|---|
| Base slurry I | 0.40 | 1.73 | 120° C. | 55 | — | 22.0 | — | |
| | | | 150° C. | 55 | — | | | |
| Example 1 | 0.92 | 0.37 | 120° C. | 81 | 1.20 | 23.7 | 1.08 | Normal |
| | | | 150° C. | 72 | 1.12 | | | |
| Example 2 | 0.87 | 0.51 | 120° C. | 71 | 1.30 | 23.1 | 1.05 | Normal |
| | | | 150° C. | 65 | 1.18 | | | |
| Example 3 | 0.90 | 0.43 | 120° C. | 61 | 1.10 | 24.0 | 1.09 | Normal |
| | | | 150° C. | 61 | 1.10 | | | |
| Example 4 | 0.65 | 0.70 | 120° C. | 58 | 1.05 | 21.1 | 0.96 | Normal |
| | | | 150° C. | 56 | 1.00 | | | |
| Example 5 | 0.95 | 0.20 | 120° C. | 81 | 1.50 | 24.2 | 1.10 | Normal |
| | | | 150° C. | 72 | 1.31 | | | |
| Example 6 | 0.82 | 0.58 | 120° C. | 78 | 1.42 | 21.8 | 0.99 | Normal |
| | | | 150° C. | 71 | 1.29 | | | |
| Example 7 | 0.77 | 0.62 | 120° C. | 82 | 1.49 | 21.3 | 0.97 | Normal |
| | | | 150° C. | 77 | 1.40 | | | |
| Comparative Example 1 | 0.60 | 0.80 | 120° C. | 99 | 1.80 | 19.8 | 0.90 | Normal |
| | | | 150° C. | 88 | 1.60 | | | |
| Comparative Example 2 | 0.86 | 0.53 | 120° C. | 118 | 2.16 | 19.4 | 0.88 | Normal |
| | | | 150° C. | 94 | 1.71 | | | |

TABLE 3

| Source of dispersants | Liquidity index n | Con-sistency coefficient K | Thickening time, min (temperature rise rate of 2° C./min) | | Thickening index (ratio of thickening time) | Com-pressive strength at 24 h, MPa | Com-pressive index at 24 h | Thickening linearity |
|---|---|---|---|---|---|---|---|---|
| Base slurry II | 0.71 | 1.67 | 120° C. | 98 | — | 20.8 | — | |
| | | | 150° C. | 75 | — | | | |
| Example 1 | 0.88 | 0.40 | 120° C. | 124 | 1.26 | 22.2 | 1.07 | Normal |
| | | | 150° C. | 82 | 1.09 | | | |
| Example 2 | 0.83 | 0.54 | 120° C. | 128 | 1.31 | 21.4 | 1.03 | Normal |
| | | | 150° C. | 89 | 1.19 | | | |
| Example 3 | 0.87 | 0.47 | 120° C. | 106 | 1.09 | 22.0 | 1.01 | Normal |
| | | | 150° C. | 83 | 1.11 | | | |
| Example 4 | 0.78 | 0.69 | 120° C. | 101 | 1.03 | 20.4 | 0.98 | Normal |
| | | | 150° C. | 77 | 1.02 | | | |
| Example 5 | 0.92 | 0.28 | 120° C. | 145 | 1.48 | 22.7 | 1.09 | Normal |
| | | | 150° C. | 97 | 1.29 | | | |
| Example 6 | 0.79 | 0.61 | 120° C. | 137 | 1.40 | 20.4 | 0.98 | Normal |
| | | | 150° C. | 96 | 1.28 | | | |
| Example 7 | 0.76 | 0.68 | 120° C. | 146 | 1.49 | 20.0 | 0.96 | Normal |
| | | | 150° C. | 106 | 1.41 | | | |
| Comparative Example 1 | 0.73 | 0.77 | 120° C. | 169 | 1.73 | 19.0 | 0.91 | Normal |
| | | | 150° C. | 113 | 1.50 | | | |
| Comparative Example 2 | 0.82 | 0.60 | 120° C. | 205 | 2.10 | 18.7 | 0.90 | Normal |
| | | | 150° C. | 125 | 1.66 | | | |

TABLE 4

| Source of dispersants | Liquidity index n | Con-sistency coefficient K | Thickening time, min (temperature rise rate of 2° C./min) | | Thickening index (ratio of thickening time) | Com-pressive strength at 24 h, MPa | Com-pressive index at 24 h | Thickening linearity |
|---|---|---|---|---|---|---|---|---|
| Base slurry III | 0.60 | 1.41 | 120° C. | 305 | — | 18.5 | — | |
| | | | 150° C. | 214 | — | | | |
| Example 1 | 0.80 | 0.45 | 120° C. | 331 | 1.09 | 19.6 | 1.06 | Normal |
| | | | 150° C. | 228 | 1.07 | | | |
| Example 2 | 0.83 | 0.54 | 120° C. | 328 | 1.08 | 18.9 | 1.02 | Normal |
| | | | 150° C. | 218 | 1.02 | | | |
| Example 3 | 0.87 | 0.47 | 120° C. | 306 | 1.00 | 19.1 | 1.03 | Normal |
| | | | 150° C. | 212 | 0.99 | | | |
| Example 4 | 0.78 | 0.69 | 120° C. | 302 | 0.99 | 17.9 | 0.97 | Normal |
| | | | 150° C. | 207 | 0.97 | | | |
| Example 5 | 0.92 | 0.28 | 120° C. | 335 | 1.10 | 18.7 | 1.01 | Normal |
| | | | 150° C. | 219 | 1.02 | | | |
| Example 6 | 0.79 | 0.61 | 120° C. | 331 | 1.09 | 17.9 | 0.97 | Normal |
| | | | 150° C. | 215 | 1.00 | | | |
| Example 7 | 0.76 | 0.68 | 120° C. | 348 | 1.14 | 17.7 | 0.96 | Normal |
| | | | 150° C. | 224 | 1.05 | | | |
| Com-parative Example 1 | 0.73 | 0.77 | 120° C. | 387 | 1.27 | 17.1 | 0.92 | Normal |
| | | | 150° C. | 255 | 1.19 | | | |
| Com-parative Example 2 | 0.82 | 0.60 | 120° C. | 365 | 1.20 | 17.3 | 0.94 | Normal |
| | | | 150° C. | 244 | 1.14 | | | |

As can be seen from the evaluation results of Tables 2, Table 3 and Table 4, the dispersants provided by the present disclosure have desirable dispersibility, and do not have the retarding property at a temperature higher than 120'C, and have desired compatibility with the filtrate reducer, the retarders and the like.

The foregoing is only a preferred embodiment of the present disclosure. It shall be noted that in light of the technical teachings provided by the present disclosure, other equivalent modifications and improvements may be made by those skilled in the art based on the common knowledge in the technical field, the modifications and improvements shall be deemed to fall within the protection scope of the present disclosure.

The invention claimed is:

1. A polymer having a dispersing function, comprising:

a structural unit (a), a structural unit (b) and a structural unit (c), wherein:

the structural unit (a) is provided by an unsaturated polyether, the structural unit (b) is provided by an unsaturated acid and/or a salt thereof and/or an anhydride thereof, and the structural unit (c) is provided by a silane and/or siloxane comprising a polymerizable group and having no less than five carbon atoms;

the molar ratio of the structural unit (a), the structural unit (b), and the structural unit (c) is 1:(1-20):(0.01-0.5);

the polymer has a weight average molecular weight of 20,000-90,000 g/mol;

the silane and/or siloxane has a structure represented by formula (I):

(I)

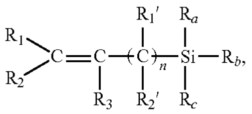

in formula (I), each of $R_1$, $R_2$, $R_3$, $R_1'$ and $R_2'$ is independently selected from H and C1-C4 alkyl; $R_a$, $R_b$ and $R_c$ are each independently selected from H, C1-C4 alkyl, and C1-C4 alkoxy, and n is an integer of 5-25.

2. The polymer of claim 1, wherein the molar ratio of the structural unit (a), the structural unit (b), and the structural unit (c) is 1:(4-12):(0.05-0.3), and the polymer has a weight average molecular weight of 25,000-55,000 g/mol.

3. The polymer of claim 1, wherein the silane and/or silaxane is at least one selected from the group consisting of 7-octenyl trimethoxysilane, vinyl dodecyl trimethoxysilane, vinyl hexadecyl trimethoxysilane, and vinyl octadecyl trimethoxysilane.

4. The polymer of claim 1, wherein the polymer has a comb-shaped structure; and/or, the polymer is a random copolymer, and the DSC peak of the polymer is a single peak.

5. The polymer of claim 1, wherein the unsaturated polyether has a structure represented by formula (2):

(2)

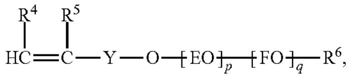

in formula (2),

E denotes an alkylene having 2-4 carbon atoms;

F denotes an alkylene having 2-4 carbon atoms and different from E;

$R^4$ and $R^5$ each independently denotes H or an alkyl having 1-5 carbon atoms;

$R^6$ denotes an alkyl having 1-4 carbon atoms;

Y denotes an alkylene having 1-5 carbon atoms;

p denotes an integer of 0-200;

q denotes an integer of 0-200; and $p+q>10$.

6. The polymer of claim 1, wherein the unsaturated acid is at least one selected from the group consisting of acrylic acid, methacrylic acid, vinylsulfonic acid, vinylphosphoric acid, maleic acid, itaconic acid, fumaric acid, 2-acrylamido-2-methylpropanesulfonic acid, styrenesulfonic acid, and propenylsulfonic acid.

7. A polycarboxylic acid cement dispersant having a thickening index not more than 1.5 at a temperature of 120° C. or more, a 24 h compressive strength index not less than 0.8 at a temperature of 110° C., a consistency coefficient not more than 0.8 at a temperature of 85° C., and a liquidity index n not less than 0.6 at a temperature of 85° C., wherein the polycarboxylic acid cement dispersant comprises a polymer, and the polymer comprises a structural unit (a), a structural unit (b) and a structural unit (c), wherein the structural unit (a) is provided by an unsaturated polyether, the structural unit (b) is provided by an unsaturated acid and/or a salt thereof and/or an anhydride thereof, and the structural unit (c) is provided by a silane and/or siloxane comprising a polymerizable group and having no less than five carbon atoms;

the molar ratio of the structural unit (a), the structural unit (b), and the structural unit (c) is 1:(1-20):(0.01-0.5), and the polymer has a weight average molecular weight of 20,000-90,000 g/mol;

the silane and/or siloxane has a structure represented by formula (I):

(I)

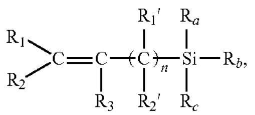

in formula (I), each of $R_1$, $R_2$, $R_3$, $R_1'$ and $R_2'$ is independently selected from H and C1-C4 alkyl; $R_a$, $R_b$ and $R_c$ are each independently selected from H, C1-C4 alkyl, and C1-C4alkoxy, and n is an integer of 5-25.

8. The polycarboxylic acid cement dispersant of claim 7, wherein the polycarboxylic acid cement dispersant has a thickening index within a range of 0.95-1.5 at a temperature of 150° C.

9. The polycarboxylic acid cement dispersant of claim 7, wherein the polycarboxylic acid cement dispersant comprises a polymer, and a content of the polymer is within a range of 10-90 wt % based on the total amount of the polycarboxylic acid cement dispersant.

10. A method for preparing a polycarboxylic acid cement dispersant, the method comprising:

subjecting a monomer mixture to a polymerization reaction in water under solution polymerization conditions in the presence of an initiator to obtain a polymer, wherein the monomer mixture comprises a monomer-A which is an unsaturated polyether, a monomer-B which is an unsaturated acid and/or a salt thereof and/or an anhydride thereof, and a monomer-C which is a silane and/or siloxane comprising a polymerizable group and having no less than five carbon atoms; and the molar ratio of the monomer-A, the monomer-B, and the monomer-C in the monomer mixture is 1:(1-20):(0.01-0.5);

the resulting polymer has a weight average molecular weight of 20,000-90,000;

the silane and/or siloxane has a structure represented by formula (I):

(I)

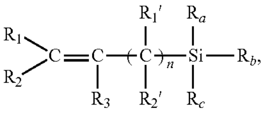

in formula (I), each of $R_1$, $R_2$, $R_3$, $R_1'$ and $R_2'$ is independently selected from H and C1-C4 alkyl; $R_a$, $R_b$ and $R_c$ are each independently selected from H, C1-C4 alkyl, and C1-C4 alkoxy, and n is an integer of 5-25.

11. The method of claim 10, wherein the molar ratio of the monomer-A, the monomer-B, and the monomer-C is 1:(4-12):(0.05-0.3).

12. The method of claim 10, wherein the unsaturated polyether has a structure represented by formula (2):

(2)

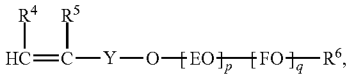

in formula (2),

E denotes an alkylene having 2-4 carbon atoms;

F denotes an alkylene having 2-4 carbon atoms and different from E;

$R^4$ and $R^5$ each independently denotes H or an alkyl having 1-5 carbon atoms;

$R^6$ denotes an alkyl having 1-4 carbon atoms;

Y denotes an alkylene having 1-5 carbon atoms;

p denotes an integer of 0-200;

q denotes an integer of 0-200; and $p+q>10$.

13. The method of claim 10, wherein the unsaturated acid is at least one selected from the group consisting of acrylic acid, methacrylic acid, vinylsulfonic acid, vinylphosphoric acid, maleic acid, itaconic acid, fumaric acid, 2-acrylamido-2-methylpropanesulfonic acid, styrenesulfonic acid, and propenylsulfonic acid.

14. The method of claim 10, wherein the solution polymerization conditions include a temperature of 40-80° C. and a duration of 1-10 hours.

15. The method of claim 10, wherein the initiator is at least one selected from the group consisting of ascorbic acid, sodium formaldehyde sulfoxylate, and sodium dithionite; and/or, the initiator is contained in an amount of 0.1-1 wt % of the total amount of the monomer mixture.

16. The method of claim 10, wherein the polymerization reaction is carried out in the presence of an oxidant and/or a chain transfer agent, the oxidant is at least one selected from the group consisting of hydrogen peroxide, peroxyacetic acid, ammonium persulfate, sodium persulfate, and potassium persulfate;

and/or, the chain transfer agent is selected from mercaptoacetic acid and 3-mercaptopropionic acid.

17. The polymer of claim 5, wherein the unsaturated polyether is at least one selected from the group consisting of methyl allyl polyoxyethylene ether, methyl allyl polyoxypropylene ether, isopentenylpolyoxyethylene ether, and isobutylene polyoxyethylene ether.

18. The method of claim 12, wherein the unsaturated polyether is at least one selected from the group consisting of methyl allyl polyoxyethylene ether, methyl allyl polyoxypropylene ether, isopentenylpolyoxyethylene ether, and isobutylene polyoxyethylene ether.

* * * * *